Nov. 3, 1931.  C. E. ERICKSON  1,830,054
SPEEDOMETER GLASS ATTACHMENT
Filed Aug. 11, 1928
Fig. 1.
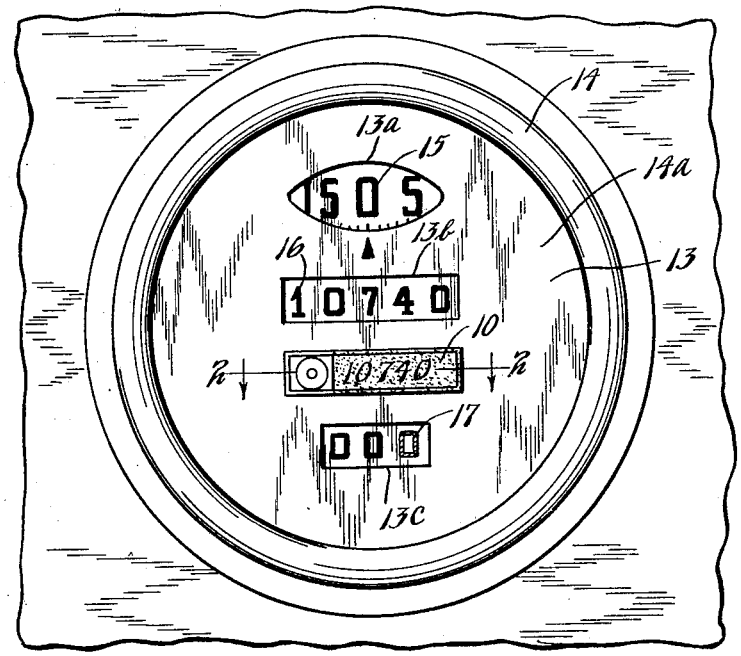
Fig. 2.
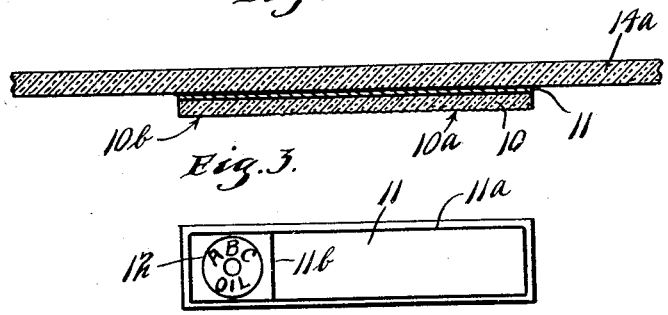
Fig. 3.
Fig. 4.
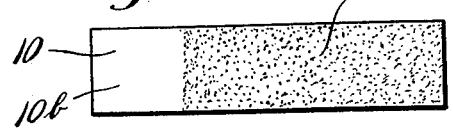
INVENTOR.
CARL E. ERICKSON.
BY HIS ATTORNEYS.

Patented Nov. 3, 1931

1,830,054

UNITED STATES PATENT OFFICE

CARL E. ERICKSON, OF MINNEAPOLIS, MINNESOTA

SPEEDOMETER GLASS ATTACHMENT

Application filed August 11, 1928. Serial No. 298,889.

This invention relates to a speedometer or similar instrument such as commonly mounted on the instrument board of an automobile or other vehicle and particularly to a device adapted to be secured to the lens of such a speedometer. As is well known, such speedometers as now generally constructed, have a dial which has a slot therein with which an indicator alines, which can be observed through said slot. This indicator usually registers the total number of miles travelled by the vehicle.

It is the custom, and in fact, is necessary in the modern automobile, to change the lubricating oil at certain times, and it is also the common practice to have the automobile greased at certain times. The number of miles travelled between these operations varies with different automobiles and drivers, but a great many drivers change the oil every thousand miles and have the car greased every five hundred miles. It is desirable to have some means or record for telling when the oil was last changed, and when the car was last greased, so that it can be readily seen how many miles have been travelled since, and when it is necessary to again change the oil or have the car greased. It is not always possible to have these operations performed just when the speedometer indicates a certain number of miles, which fact renders the miles or record above referred to, more necessary.

It is an object of this invention, therefore, to provide a small, inexpensive and convenient device which can be attached to the speedometer to indicate the time when the car was last greased or when the oil was last changed.

It is another object of the invention to provide such a device comprising a small piece of transparent material such as glass or celluloid, one surface of which has been ground, etched or roughened, so that it can readily be written upon with a lead pencil and so that such writing can be easily erased therefrom.

It is more specifically an object of the invention to provide such a device as set forth in the preceding paragraph, on the under surface of which is secured a paper or other sheet of material carrying an advertisement adapted to show through the transparent sheet, and a portion of the transparent sheet may be left unetched so that the advertisement may be more clearly seen.

These and other objects and advantages of the invention will be fully set forth in the following description made in connection with the accompanying drawings, in which like reference characters refer to similar parts throughout the several views and in which:—

Fig. 1 is a view in front elevation of a speedometer showing the invention applied thereto;

Fig. 2 is a horizontal section on line 2—2 of Fig. 1, as indicated by the arrows;

Fig. 3 is a face view of the sheet used carrying the advertisement; and

Fig. 4 is a face view of a transparent sheet used.

Referring to the drawings, the device comprises a small piece 10 of transparent material such as thin glass, celluloid or mica. While this piece of material may be of various shapes, in the embodiment of the invention it is shown as being rectangular in shape. This sheet has the greater portion 10a of one surface etched or ground so as to present a roughened surface. This roughened surface makes it possible to write thereon with a lead pencil, and such writing may also be easily erased either with a moist cloth or with an ordinary rubber eraser. The portion 10b of the surface of member 10 may be left clear or unetched or unground. A sheet 11 of paper or other similar material is provided, of substantially the same size as the sheet 10 and this sheet 11 is shown as having an advertisement 12 printed thereon which is enclosed in a border line 11a and transverse line 11b. The sheet 11 is secured to the sheet 10 against the surface opposite the etched surface 10a and the advertisement 12 and other parts on the sheet 12 will show through the sheet 10. The etched or ground portion 10a of sheet 10 does not obscure the matter carried on the sheet 11. However, the advertisement 12 shows through better when the sheet 10 is not etched and the unetched portion 10b is therefore substantially co-extensive with the portion of the sheet 11 carrying the advertisement 12. The side of the sheet 11 opposite that carrying the advertisement will be provided with a layer of adhesive.

The device comprising the sheet 10 with the sheet 11 secured thereto is adapted to be secured to the lens 14a of a speedometer 14 such as shown in Fig. 1 and such as now commonly used on automobiles. Such speedometers commonly have an opening 13a in the dial through which a speed indicator having the numerals 15 thereon is visible. Such speedometers also customarily have an opening such as shown at 13b which is usually illustrated as rectangular in shape, through which may be observed an indicator carrying the numerals 16 indicating the total number of miles travelled. The lower opening 13c is illustrated, through which may be seen an indicator carrying numerals 17 adapted to indicate the number of miles travelled on a certain trip. The device of the invention co-operates with the slot 13b and the indicator having the numeral 16 thereon, and preferably is of substantially the same size as the slot 13b.

In operation the device will be placed on the lens 14a of the speedometer as shown in Fig. 1, preferably just below and in alinement with the slot 13b. The device being of substantially the same size of said slot and placed symmetrically therewith, makes a pleasing appearance and does not in any way mar the appearance of the speedometer. The device can conveniently be placed on the lens by the operator at the oil station when he changes the oil and the advertisement 12 may conveniently carry an advertisement of the company which has changed the oil. The driver can then write on the surface 10a with his pencil the number of miles shown by the numerals 16. He will thus have before him at all times a record of when the oil was last changed and will know that the oil should be again changed when the numerals 16 indicate a cerain further distance, as for instance, another thousand miles. He will also have the name of the oil company or the name of the oil handled thereby visible, and this will remind him of said oil and may lead him to again go to this company's station when the oil is to be again changed. The driver may also write on the surface 10a the number of miles registered when the car was greased, and both records may be carried on the surface 10a if desired. He will thus know when the car is due to be again greased.

From the above description it is seen that applicant has provided a very simple and efficient device, one which can be easily and inexpensively made and which will have great utility as a record, and also great utility as an advertisement. It will be seen that there is a co-operation between the device and the speedometer. The device is closely adjacent the slot 13b and will have written thereon the indication which is at one time registered by the indicator and the indicator appearing through slot 13b. The device has been demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. An article of manufacture constituting a device adapted to be placed in front of the dial of a speedometer of an atuomobile comprising an elongated rectangular sheet of transparent material having a roughened portion on its outer surface and having a clear portion and having a sheet of material secured to its other surface carrying indicia adapted to show through said clear portion of said transparent sheet, said latter sheet of material carrying an adhesive on its reverse side adapted to secure the device over said dial.

2. In combination with the dial of a speedometer of an automobile which has an opening therein and means appearing through said opening indicating the total number of miles traveled, an elongated plate of transparent material having a portion of one side roughened to form a translucent surface so that a mark can be written thereon with a lead pencil and erased with a rubber eraser, said plate being adhesively secured to the transparent cover of said dial closely below said opening so as to have written thereon the number of miles indicated in said opening when the oil in the automobile was changed, the number of miles appearing through said opening and the writing on said sheet of material being simultaneously observable and a sheet back of the remaining transparent portion of said plate bearing printed information readable through said plate.

In testimony whereof I affix my signature.

CARL E. ERICKSON.